United States Patent [19]
Bujak, Jr.

[11] Patent Number: 5,501,265
[45] Date of Patent: Mar. 26, 1996

[54] FLUID FLOW CONTROL FOR HVAC SYSTEM WITH VALVE POSITION READJUSTMENT TO EQUALIZE CONDITIONING RATES IN MULTIPLE ZONES

[75] Inventor: Walter E. Bujak, Jr., Suffield, Conn.

[73] Assignee: Carrier Corporation, Syracuse, N.Y.

[21] Appl. No.: 250,880

[22] Filed: May 31, 1994

[51] Int. Cl.⁶ .................................................. F25B 29/00
[52] U.S. Cl. .................. 165/22; 165/34; 165/39; 165/50; 165/101; 236/1 B; 237/8 R
[58] Field of Search ............................ 165/22, 34, 101, 165/50, 39; 236/1 B; 237/8 R

[56] References Cited

U.S. PATENT DOCUMENTS

| | | | |
|---|---|---|---|
| 3,167,113 | 1/1965 | Kleiss | 165/34 |
| 3,176,759 | 4/1965 | Windham | 165/50 |
| 3,202,208 | 8/1965 | Geiringer | 165/50 |
| 4,150,788 | 4/1979 | Matsumoto et al. | 165/22 |
| 4,291,750 | 9/1981 | Clyne et al. | 165/34 |
| 4,381,814 | 5/1983 | Funk | 165/34 |
| 4,487,028 | 12/1984 | Foye | 165/22 |
| 4,601,328 | 7/1986 | Tasaka et al. | 165/34 |
| 4,884,743 | 12/1989 | Baehr | 165/22 |
| 5,417,368 | 5/1995 | Jeffery et al. | 165/22 |

FOREIGN PATENT DOCUMENTS

| | | | |
|---|---|---|---|
| 0011044 | 1/1985 | Japan | 165/22 |
| 0225594 | 10/1986 | Japan | 165/34 |

OTHER PUBLICATIONS

Hartman, "Trav—A New HVAC Concept," Heating, Piping Air Conditioning, Jul. 1989 pp. 69–73.

Primary Examiner—John K. Ford

[57] ABSTRACT

A process is disclosed for adjusting the valve position of flow control valves which govern the flow of a heat exchange fluid to a plurality of individually controlled zones. The process resides primarily in a system controller in communication with a number of separate zone controllers. The system controller periodically obtains temperature and mode of operation information from each zone controller and thereafter computes the amount of time necessary to change the temperature by one degree in each zone. The computed amount of time per degree change in temperature is compared with the average for all zones in a similar mode of operation. Offsets are calculated for active flow control valves in each zone depending on whether the computed amount of time per degree change in temperature is above or below the average for all corresponding zones in the same mode of operation. The offsets are transmitted to the zone controllers for use in adjusting the valve positions that are to be commanded by the zone controllers.

14 Claims, 7 Drawing Sheets

FLUID FLOW CONTROL FOR HVAC SYSTEM WITH VALVE POSITION READJUSTMENT TO EQUALIZE CONDITIONING RATES IN MULTIPLE ZONES

BACKGROUND OF THE INVENTION

This invention relates to the control of chilled or warmed water flowing to a plurality of individually controlled temperature zones within a building. In particular, this invention relates to the balancing of the demand for the chilled or warmed water among the individually controlled temperature zones.

Controlling the flow of chilled or warmed water to a plurality of individual zones in a home or office building is well known. The amount of water flowing to a given zone depends on that zone's needs as measured by a thermostat sensing the temperature of the space or zone to be heated or cooled. When the temperature of the space deviates from a predetermined set point, a valve controlling the flow of water to the zone is moved to a more open position allowing a greater volume of chilled or warmed water to flow through one or more heat exchangers in the zoned space. Conversely, as the temperature of the space approaches the set point, the valve is moved to a more closed position so as to decrease the volume of water flowing through the heat exchangers in the zoned space.

The above flow control does not allow for adjustments in valve position for other than temperature difference. As a result, some zones may reach their respective set points quicker than other zones. This will be especially true in those instances where the measurement of change of temperature in a zone is substantially greater than the other zones.

OBJECTS OF THE INVENTION

It is an object of the invention to provide a system for controlling the flow of chilled or warmed water to a plurality of zones which is responsive to the measurements of change of temperature in the zones.

It is another object of the invention to provide a system which quickly adjusts to large differences in the measurements of change of temperature in the zones being heated or cooled by the chilled or warmed water.

SUMMARY OF THE INVENTION

The above and other objects of the invention are achieved by monitoring the temperatures of each zone and calculating the time to change the temperature in each zone by one degree. An average time per degree change of temperature is calculated for all zones in a heating mode. An average time per degree change of temperature is also calculated for all zones in a cooling mode. Each zone's individual time per degree change of temperature is next compared with either the average heating or the average cooling time per degree change of temperature depending on the zone's operating mode. Any individual time per degree change of temperature that is greater than the average to which it is compared will trigger the calculation of an offset to the valve position of the appropriate valve governing the flow of either chilled or warmed water to the zone. The offset will reduce the valve position to be commanded when the zone is receiving more than its share of warmed or chilled water. If an individual time per degree change of temperature is lower than the average, than the offset to the valve position of the appropriate valve governing the flow of chilled or warmed water to that zone will be decreased. This will allow the valve to open further than its previously commanded position so as to increase thereby the flow of chilled or warmed water to the particular zone.

It is to be appreciated that the process is periodically repeated with time per degree changes of temperature being calculated and compared with a new average. Appropriate adjustments will be made to valve positions based on the newly determined offsets to valve positions.

BRIEF DESCRIPTION OF THE DRAWINGS

Other objects and advantages of the present invention will be apparent from the following description in conjunction with the accompanying drawings in which.

DESCRIPTION OF THE PREFERRED EMBODIMENT

Figure 1:
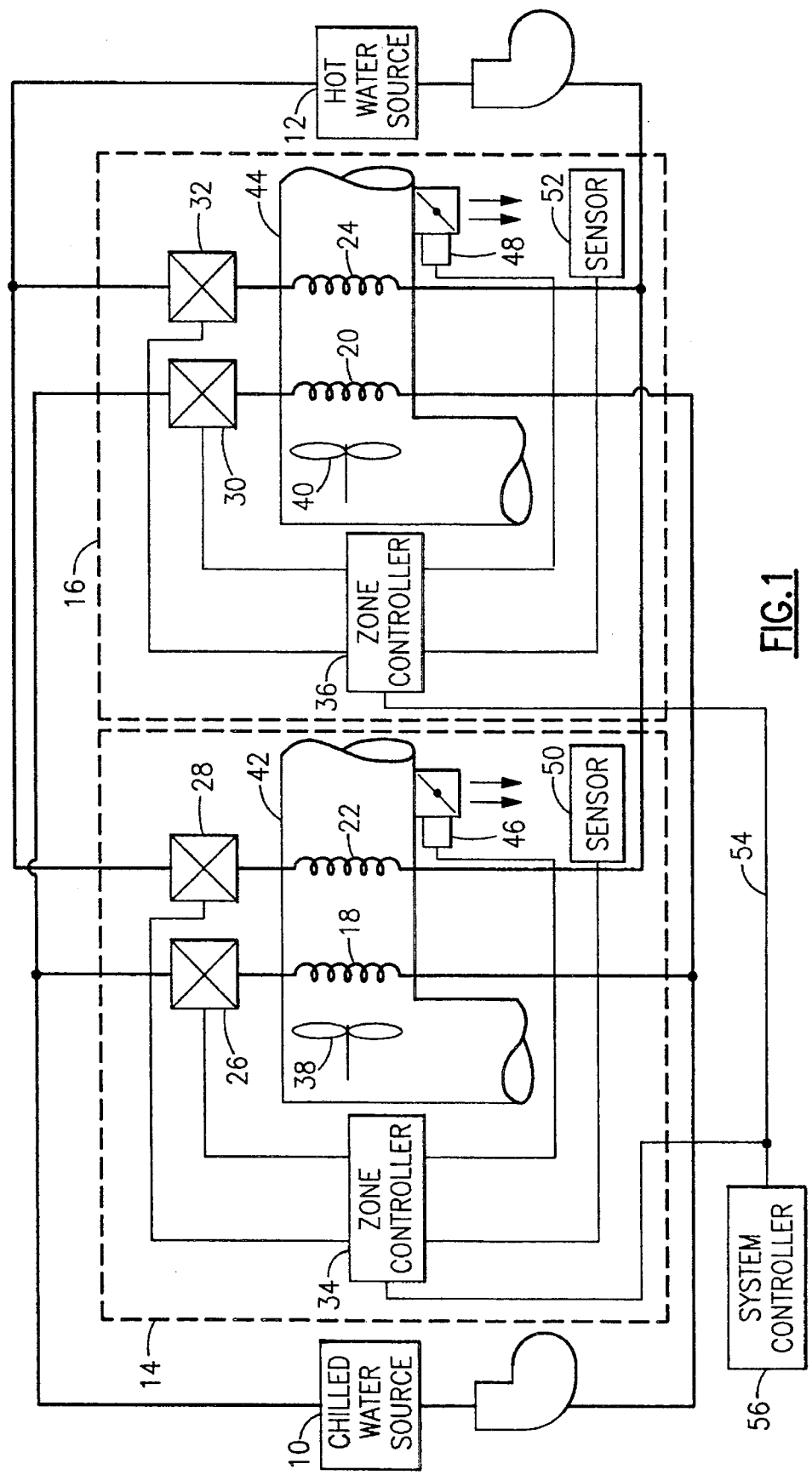
FIG. 1 illustrates a system for supplying chilled and warmed water to individual zones each having individual air handling units for heating or cooling the zones.

Referring to FIG. 1, a chilled water source 10 and a hot water source 12 supply water to temperature controlled zones 14 and 16. Chilled water is supplied to a cooling coil 18 in zone 14 and to a cooling coil 20 in zone 16. Hot water is supplied from the hot water source 12 to a heating coil 22 in zone 14 and a heating coil 24 in zone 16. The flow of water to the respective coils in the zones is governed by flow control valves 26, 28, 30 and 32. Flow control valves 26 and 28 are controlled by a zone controller 34 whereas flow control valves 30 and 32 are controlled by a zone controller 36. The zone controllers also control respective fans 38 and 40 within air handling units 42 and 44 as well as damper motors 46 and 48 respectively. Each zone controller is responsive to temperature sensors 50 and 52 within the respective zones 14 and 16.

Each zone controller is also responsive to commands on a control bus 54 from a system controller 56. The system controller 56 is preferably a programmed microprocessor which reads information from each zone controller and thereafter defines offsets to the valve positions that are to be commanded by the zone controllers. Each local zone controller thereafter adjusts the position to be commanded by the offset imposed by the system controller 56.

Figure 2:
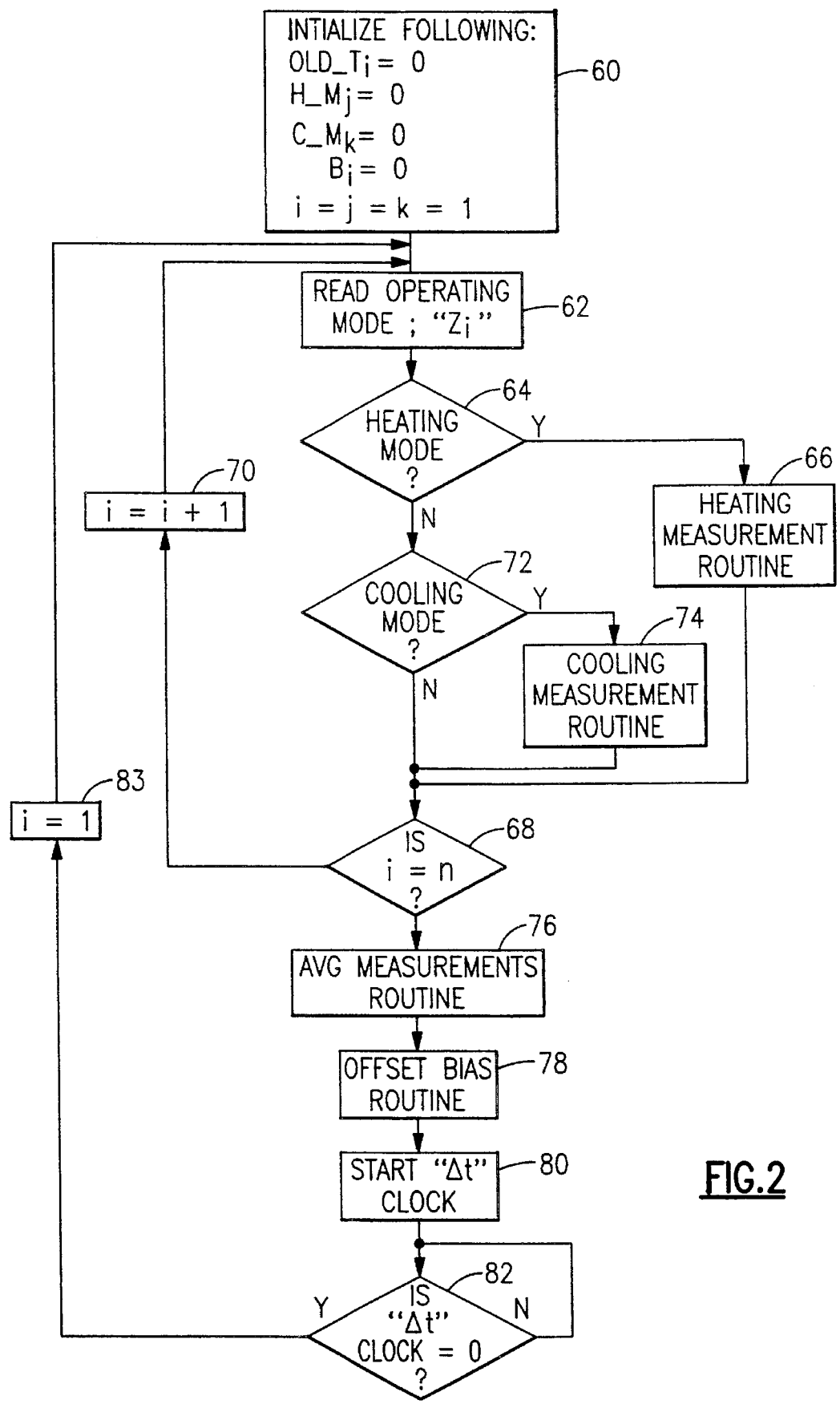
FIG. 2 illustrates a process executed by a system controller for the system of FIG. 1 which imposes offsets on the valve positions to be commanded of the valves governing the flow of the chilled and warm water to the individual heat exchange elements within the air handling units.

Referring to FIG. 2, the process for calculating the offsets to be imposed on the local zone controllers is illustrated. It is to be appreciated that this process preferably resides in memory associated with the microprocessor in the system controller. The process begins with a step 60 wherein certain variables used within the process are initialized "OLD_$T_i$", "H_$M_j$", "C $M_k$", and "$B_i$" are all set equal to zero. A series of indices, "i", "j", and "k" will be set equal to one. The index, "i", is used to identify each of the zones in FIG. 1. It is important to note that the number of zones and corresponding zone controllers in communication with the system controller 56 can be expanded beyond the two zones illustrated in FIG. 1.

Following initialization, the system controller proceeds to a step 62 and reads the operating mode for the zone controller, "$Z_i$". Since the zone index will have been initially set equal to one, the operating mode for the first zone controller in FIG. 1 will be read by the system controller. It is to be appreciated that this is accomplished by addressing the particular zone controller and reading the operating mode of that particular zone controller. Inquiry is next made in a step 64 as to whether the thus read operating mode is a heating mode. If the answer is yes, the microprocessor proceeds to a heating measurement routine in a step 66. As will be explained in detail hereinafter, the heating measurement routine is operative to calculate the amount of time it takes to raise the temperature by one degree in the particular zone identified by the zone index, "i". The system controller proceeds to a step 68 and inquires as to whether the zone index, "i", is equal to "n" where "n" defines the last zone controller that is to be queried. Since the zone index is only equal to one, the system controller will increment the zone index in step 70 and return to read the operating mode for the next zone controller in step 62. Assuming the zone controller is indicating a cooling mode of operation, the system controller will proceed along the no path out of step 64 to a step 72. Since a cooling mode has been indicated, the system controller proceeds to a step 74 and calculates a cooling measurement for the particular zone. This cooling measurement will be expressed in terms of time to achieve one degree of cooling.

The system controller will proceed out of either step 72 or step 74 to step 68 and again inquire as to whether the zone index has reached the last zone. When this occurs, the system controller proceeds to a step 76 and implements an average measurements routine. This routine will calculate an average heating measurement for those zones in a heating mode and will also calculate an average cooling measurement for those zones in a cooling mode. Following the calculation of the average heating and cooling rates, the system controller will proceed to an offset bias routine in a step 78. The offset bias routine will calculate any offset that is to occur to the position that is to be commanded of the flow control valve being actively controlled by each particular zone controller. The control valve being actively controlled will of course depend on whether the particular zone controller is in a heating mode or a cooling mode. For instance, the valve position of flow control valve 28 may experience an offset adjustment if zone controller 34 is in a heating mode. The offset bias that is calculated will depend on whether the heating measurement for zone 14 is above or below the average heating rate. After all offsets to valve positions of active valves have been calculated in the offset bias routine, the system controller will proceed to a step 80 and initiate a clock. The clock will begin a count from a predetermined time of Δt. The system controller monitors the clock value in a step 83 and proceeds to a step 84 when the clock has been decremented to zero. The system controller reinitializes the zone index "i" equal to one in step 83 before again implementing the process of reading the mode of operation for each zone controller. A heating measurement is calculated by a heating measurement routine when a heating mode is detected. A cooling measurement is calculated by a cooling measurement routine when a cooling mode is detected. Neither measurement is of course calculated if a zone controller indicates a mode of operation other than heating or cooling. In the latter case, the zone index is merely incremented and the next zone controller is addressed and queried as to its operating mode.

Figure 3:
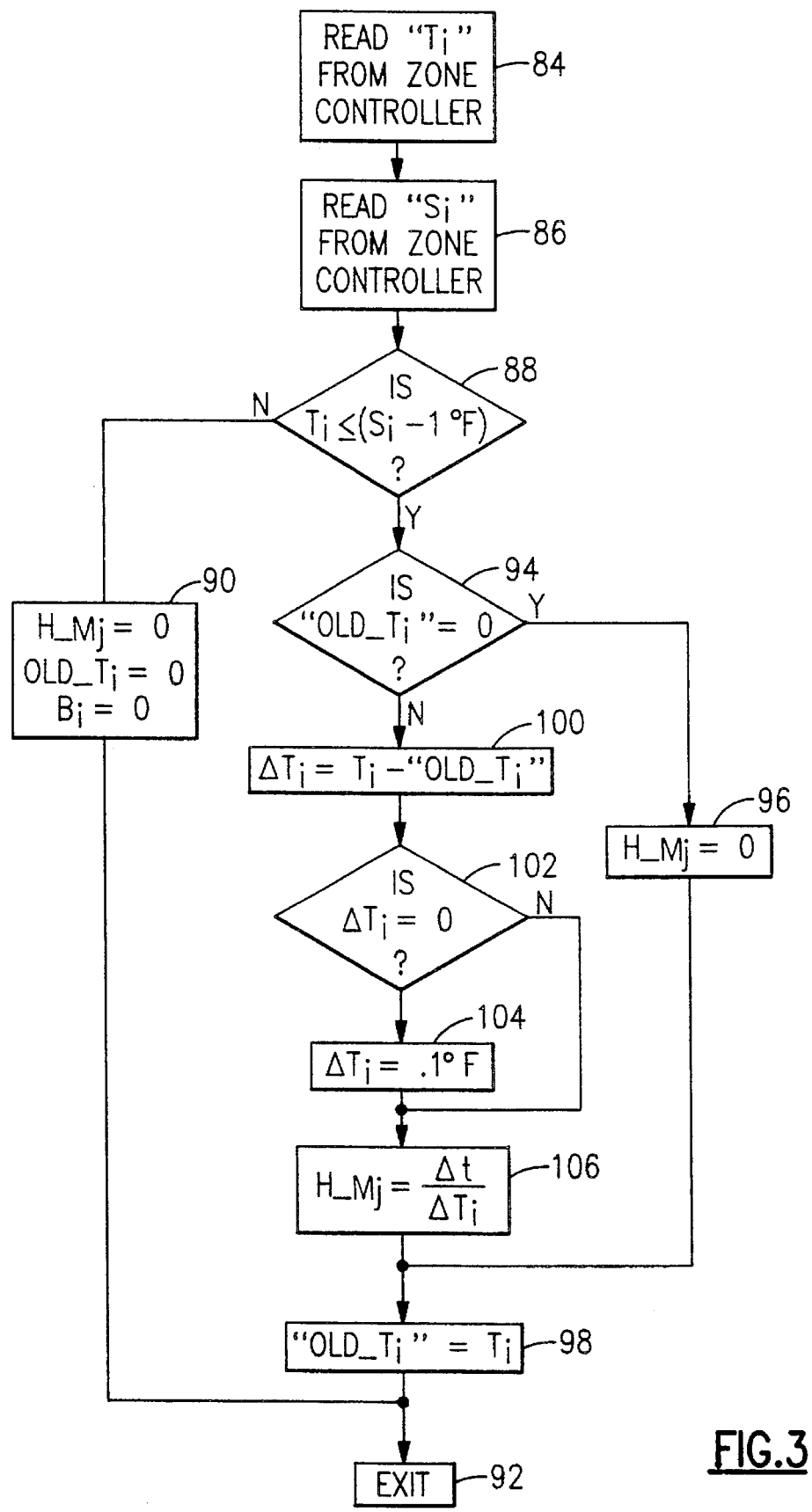
FIG. 3 illustrates a routine within the process of FIG. 2 for calculating the time per degree change of temperature in each individual zone of FIG. 1 in a heating mode of operation.

Referring to FIG. 3, the heating measurement routine of step 66 is illustrated in further detail. When a particular zone controller is indicating a heating mode, the system controller will read the sensed temperature $T_i$ for the particular zone in step 84. The system controller thereafter reads the set point temperature $S_i$ for the zone in a step 86. The system controller next inquires as to whether the sensed temperature $T_i$ in step 84 is less than or equal to the set point temperature read in step 86 minus one degree Fahrenheit. This is done in a step 88. In the event that the read temperature $T_i$ is within one degree of the set point temperature, the system controller proceeds to a step 90 and sets a heat measurement, H_$M_j$ equal to zero The subscript, "j", denotes the running number of times the heating measurement routine has been invoked following examination of the mode of operation of each zone controller pursuant to step 62. It is hence to be appreciated that the subscript "j" is a heating measurement index identifying each successive heating measurement calculated by the heating measurement routine as the zone index, i, is incremented from 1 to n. The system controller will also set the variable "OLD_$T_i$" equal to zero as well as the off set bias, $B_i$ equal to zero in step 90. The system controller will exit the heating measurement routine in a step 92 and proceed to step 68 in FIG. 2.

Referring again to step 88 in FIG. 3, in the event that the temperature $T_i$ is more than one degree less than set point, the system controller will proceed to a step 94 and inquire as to whether the value of "OLD_$T_i$" is equal to zero. If the value of this variable is zero, the system controller will set the heat measurement H_$M_j$ equal to zero in a step 96. The system controller will proceed from step 96 to a step 98 and set the variable OLD_$T_i$ equal to the value of the sensed temperature $T_i$.

Referring again to step 94, in the event that the value of OLD_$T_i$ is not equal to zero, the system controller will proceed to a step 100 and calculate the value of a variable $\Delta T_i$. The value of $\Delta T_i$ will be the difference between the currently sensed temperature $T_i$ and the value of the variable OLD_$T_i$. It is to be recalled that the variable OLD_$T_i$ is set equal to the previously sensed value of $T_i$ in a step 98. Since the process of FIG. 2 executes approximately once every Δt period of time, the value of OLD_$T_i$ will be the zone temperature sensed at the Δt time previously. The system controller proceeds to a step 102 and inquires as to whether the calculated $\Delta T_i$ is equal to zero. If it is, the variable will be set equal to 0.1 degrees Fahrenheit in a step 104. The system controller now calculates a heat measurement value for H_$M_j$ as being equal to Δt divided by $\Delta T_i$ in a step 106. The calculated value will be expressed in terms of the time it takes for the particular zone of heating to increase the zone temperature by one degree.

It is hence to be appreciated that the heat measurement routine of FIG. 3 will produce a calculated value of heat measurement measured in time per degree out of step 106. It will also produce a heat measurement value of zero if the variable $OLD\_T_i$ is zero or if the sensed temperature is within one degree of the set point temperature.

Figure 4:
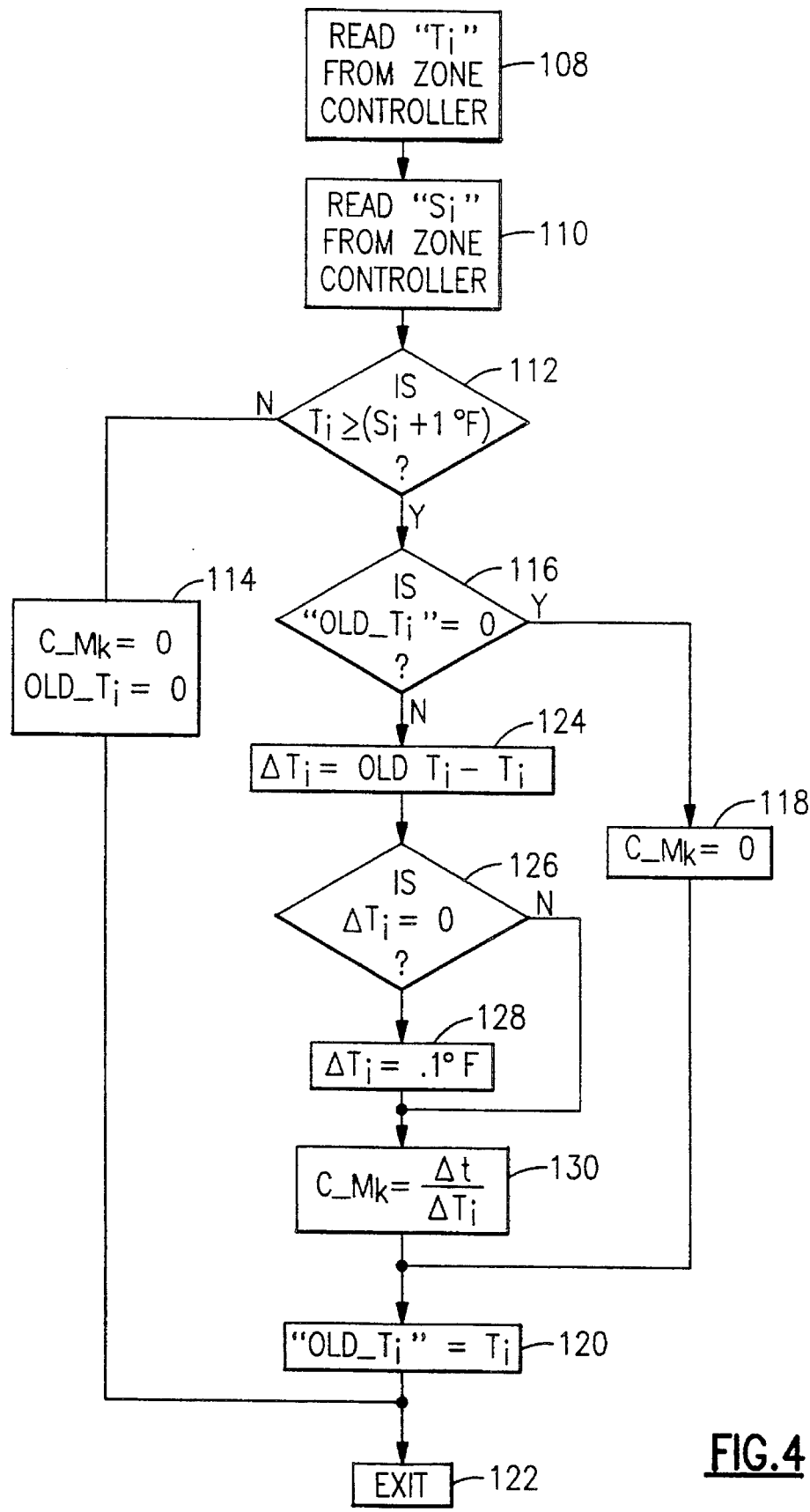
FIG. 4 illustrates a routine within the process of FIG. 2 for calculating the time per degree change of temperature in each individual zone of FIG. 1 in a cooling mode of operation.

Referring to FIG. 4, the routine for calculating cooling measurements is illustrated in detail. This routine begins with a reading of the sensed temperature from the zone controller currently identified by the zone index in a step 108. The set point temperature for the identified zone is also read in a step 110. It is to be appreciated that this information is preferably read from the zone controller which maintains current values of the zone it is controlling. The sensed temperature $T_i$ is next compared in a step 112 with the set point temperature adjusted by one degree Fahrenheit. If the temperature $T_i$ is not greater than the adjusted set point temperature, the system controller will proceed to a step 114 and set a series of variables equal to zero. These variables include a cooling measurement variable $C\_M_k$. The subscript "k" is the cooling measurement index which will denote the number of times the cooling measurement routine has been invoked following examination of each operating mode of each zone controller pursuant to step 62 of FIG. 2.

Referring again to step 112, in the event that the sensed temperature $T_i$ is greater than the adjusted set point temperature for the zone, the system controller will proceed to a step 116 and inquire as to whether the variable $OLD\_T_i$ is equal to zero. It is to be appreciated that this variable would be initially set equal to zero in step 60 or it might also be set equal to zero in step 114. In either event, the system controller will proceed to a step 118 and set the cooling measurement for the particular zone, $C\_M_k$ equal to zero. The system controller will proceed to a step 120 and set the variable $OLD\_T_i$ equal to the present value of the sensed temperature $T_i$. The system controller will proceed to exit the cooling measurement routine in step 122 and proceed to step 68 in FIG. 2.

Referring again to step 116 in FIG. 4, it is to be appreciated that any time the process of FIG. 2 has previously executed with a setting of the variable $OLD\_T_i$ equal to the sensed temperature $T_i$ in step 120, then the next execution of the process will result in the value of $OLD\_T_i$ not being equal to zero. This will prompt the system controller to exit from the step 116 to a step 124 and calculate a value for the variable $\Delta T_i$. The value calculated will be the difference between the previously sensed temperature for the particular zone and the presently sensed temperature $T_i$. Inquiry is next made in a step 126 as to whether the computed value $\Delta T_i$ is equal to zero. In the event that the calculated value is zero, the system controller will arbitrally set the variable, $\Delta T_i$, equal to one tenth degree Fahrenheit in a step 128. The calculated value of $\Delta T_i$ in step 124 or the assigned value in step 128 is used to calculate the cooling measurement for the particular zone in step 130. In particular, the time $\Delta t$ between successive executions of the process of FIG. 2 is divided by the value $\Delta T_i$. This produces the amount of time necessary for a change of one degree to occur in the temperature for the particular zone. The system controller proceeds to store the present value of $T_i$ in the variable $OLD\_T_i$ in step 120 before proceeding to step 122 and exiting the cooling measurement routine.

Figure 5:
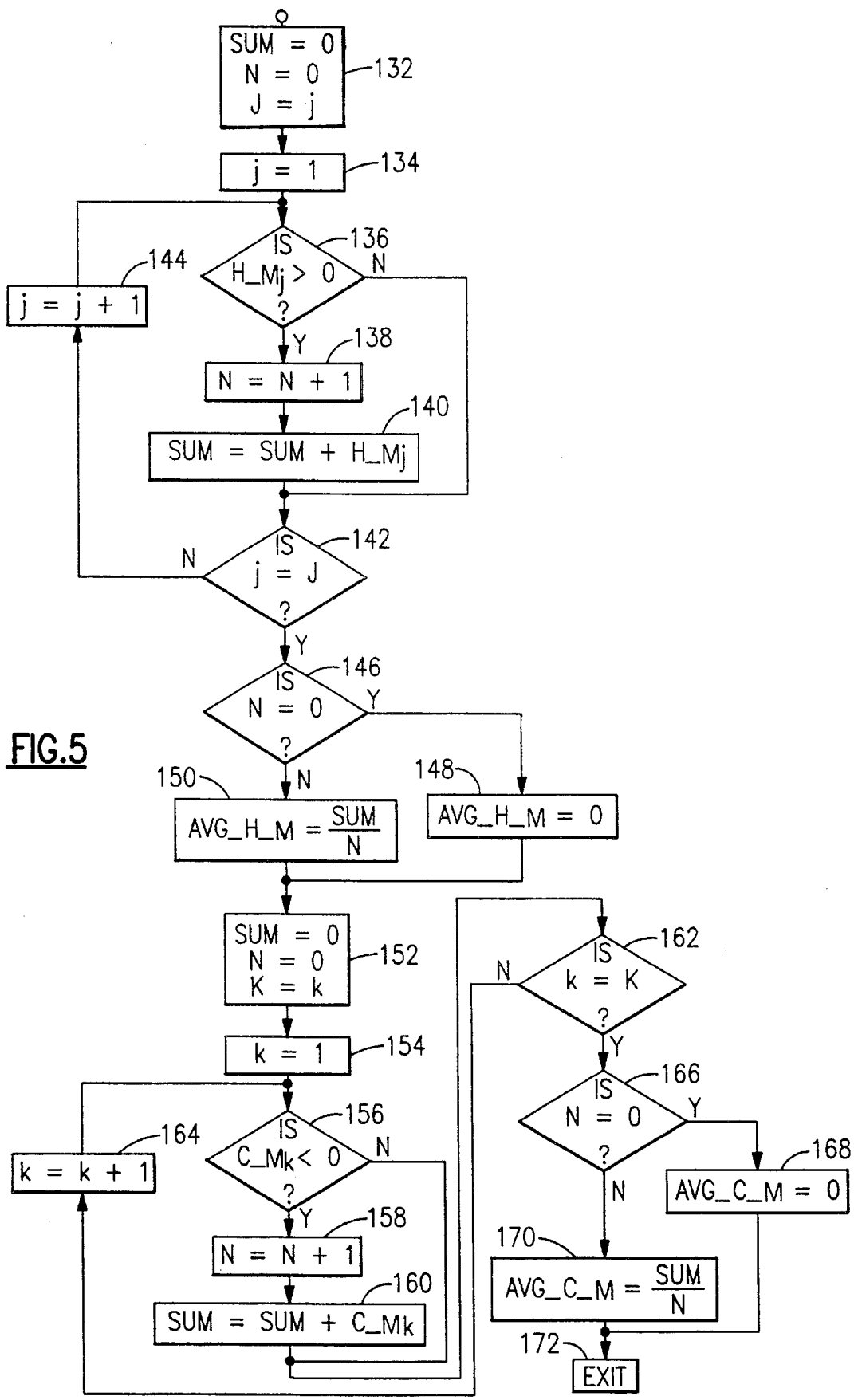
FIG. 5 illustrates a routine for calculating average time per degree change of temperature of all zones in FIG. 1 in either a heating or cooling mode of operation.

Referring to FIG. 5, the routine for calculating average heating measurement, $AVG\_H\_M$, and the average cooling measurement, $AVG\_C\_M$, is set forth. This routine begins with a step 132 wherein certain variables used in the calculation of the average heating and cooling measurements are set equal to their initial values. This includes setting a value J equal to the present value of the index "j" which it will be recalled is the present value of the total number of zones which are in a heating mode of operation. Following step 132, the index "j" is set equal to one. The controller proceeds to a step 136 and inquires as to whether the particular heating measurement $H\_M_j$ corresponding to the thus identified index value of "j" is greater than zero. This will have been a calculated value under the heating measurement routine. Assuming the heating measurement to be other than zero, the present value of "N" is incremented by one in a step 138 and the system controller proceeds to step 140.

Referring to step 140, the value of the variable "SUM" is calculated by adding the previous value of SUM to the heating measurement identified by the current value of the index "j". Inquiry is next made in step 140 as to whether "j" is equal to "J". The index "j" is incremented by one in step 144 and steps 136 through 140 are repeated until such time as the index value of "j" equals "J" in step 142. At this point in time the system controller proceeds to step 146 and inquires as to whether the numerical value of N equals zero. If N is equal to zero, then the variable, $AVG\_H\_M$, is set equal to zero in step 148. Otherwise, an average heat measurement is calculated in step 150. Referring to step 150, the variable $AVG\_H\_M$ is calculated to be the value of "SUM" divided by the value of "N". In this manner, the summed values of the heat measurements $H\_M_j$ resulting from step 140 are divided by the present value of the count of N as defined in step 138.

Following completion of the calculation of an average heating measurement, the system controller proceeds to calculate the average cooling rate. This begins with a step 152 wherein the variables SUM, N, and K are initialized. The value of "K" is set equal to the current value of the cooling index, "k". It will be remembered that the current value of the cooling index, "k", will be defined by the cooling measurement routine of FIG. 4. The cooling measurement index, "k", is subsequently set equal to one in step 154. The value of the cooling measurement identified by this particular cooling measurement index will be queried in step 156 for being less than zero. As long as the cooling measurement is less than zero, the system controller proceeds to increment the value of "N" in a step 158. The sum of the cooling measurements is next calculated in step 160 by adding the present cooling measurement to any previously summed cooling rates. The controller proceeds to step 162 and inquires as to whether the cooling index, "k" is equal to "K". The cooling index, "k", is incremented in step 164 and steps 156 through 160 are repeated until such time as the cooling index equals the value of "K" in step 162. At this time, inquiry is made as to whether the value of "N" is equal to zero in step 166. If the answer is yes, the value of average cooling rate, $AVG\_C\_M$, is set equal to zero in step 168. Otherwise an average of the cooling measurements is calculated in step 170 by dividing the value of SUM computed in step 160 by the present value of "N" defined by step 158. It is to be appreciated that the average measurements routine is now complete and the system controller exits from this routine in a step 172 to the offset bias routine defined by step 78 of FIG. 2.

Figures 6, 6A:
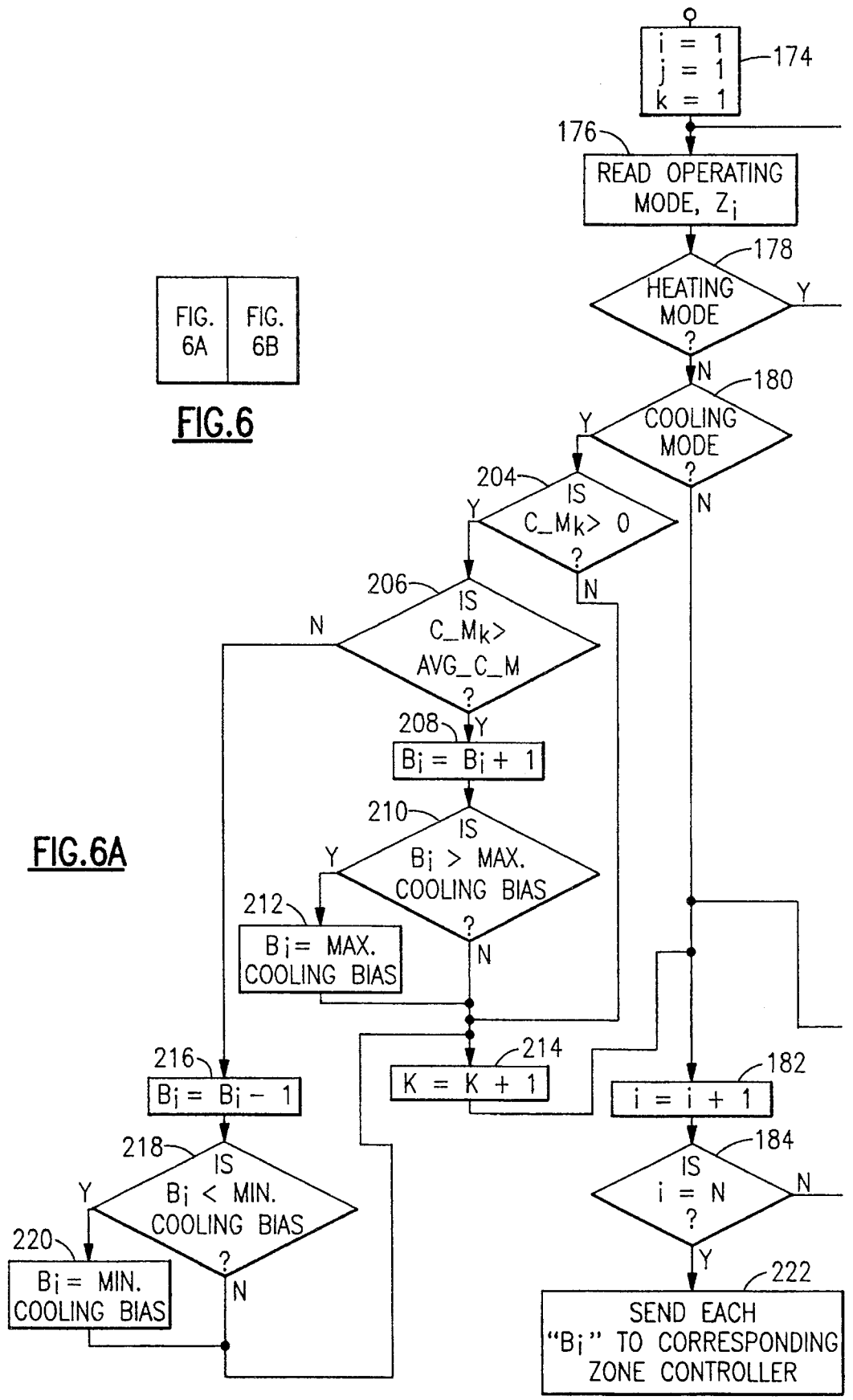
FIG. 6, (6A–B) illustrate a routine for computing offsets to the valve positions of the flow control valves governing the supply of chilled and warmed water to the heat exchange elements within the air handling units of FIG. 1.

The offset bias routine is illustrated in detail in FIG. 6 and begins with a step 174 wherein the zone index "i", the heat measurement index "j", and the cooling measurement index "k" are set equal to one. The system controller proceeds to a step 176 and reads the mode for the zone controller identified by the present value of the index "i". Since "i" is initially set equal to one, the mode, "$Z_i$", of the first zone will be read in step 176. Inquiry is next made in a step 178 as to whether the thus read mode is a heating mode. In the event that it is not, inquiry is made in step 180 as to whether the thus read zone mode is a cooling mode. In the event that it is not a cooling mode either, the system controller proceeds to increment the zone index, "i", in a step 182 before inquiring as to whether the zone index is equal to "n" in step 184. In the event that there are more zones, the system controller returns to step 176 and reads the mode, "$Z_i$," of the next zone controller identified by the incremented zone index, "i". If the mode of the next zone controller is a heating mode, the system controller exists from step 178 to a step 186 and inquires as to whether the heating measurement $H\_M_j$ is greater than zero. It will be remembered that the subscript, "j", identifies heating measurements for each of the zone controllers in a heating mode. In this regard, the first zone controller in a heating mode of operation will have a heating measurement $H\_M_j$. This zone controller may however have a zone index value of three if the previous zone controllers were for instance all in non heating modes of operation.

In the event that the heating measurement, $H\_M_j$, is greater than zero, the system controller proceeds to a step 188 and inquires as to whether the heating measurement $H\_M_j$ is greater than $AVG\_H\_M$. It will be remembered that $AVG\_H\_M$ is the average heating measurement calculated in the average measurement routine of FIG. 5. If a particular zone has a measurement greater than the average heating measurement, than the system controller proceeds from step 188 to step 190 and calculates a value of the bias offset, "$B_i$". The value that is calculated is an increment of the previously calculated value of $B_i$. It is to be understood that this value is ultimately used to offset the maximum permissible open position of a flow control valve for warmed water. In other words, this value will be translated to a valve amount that limits the otherwise open position that the flow control valve might seek under the control of the local zone controller.

The calculated value of $B_i$ in step 190 is next queried in a step 192 for exceeding a maximum permissible value of $B_i$ for heating. In other words, a limit is set on how much offset can occur for a flow control valve in a heating mode. In the event that this value has been exceeded, the system controller proceeds to a step 194 and sets the calculated value of $B_i$ equal to the maximum allowed value. Otherwise the system controller will proceed directly to step 196 and increment the heat measurement index, "j".

The system controller will next proceed to step 182 and again increment the zone index i and inquire in step 184 as to whether the zone index has reached the last numbered zone. In the event that it has not, the system controller will again execute step 176 and read the operating mode $Z_i$ of the presently identified zone controller. If the next zone controller is also in a heating mode, the system controller will proceed to step 186 and inquire as to whether the heating measurement is greater than zero. If it is, the heating measurement will be examined as to whether it is greater than the average heating measurement in step 188. In the event that the heating measurement is below average, the system controller will proceed to a step 198 and calculate a new value of the offset bias for the particular identified zone. In particular, the bias value for the particular zone will be decreased by one in step 198. Inquiry is next made in step 200 as to whether the calculated value of $B_i$ is less than a minimum heating offset bias. In the event that a minimum offset has been exceeded, the system controller will reset the value of $B_i$ to the minimum heating offset value in step 202. The system controller will proceed out of either steps 200 or 202 to step 196 and again increment the value of the heating measurement index "j". The zone index will next be incremented in step 182 and the system controller will again proceed around to step 176 in the event that yet another zone is to be examined. Assuming that the next zone controller is in a cooling mode, the system controller will proceed out of step 180 to a step 204 and inquire as to whether the calculated cooling measurement $C\ M_k$ is greater than zero. It will be remembered that the cooling measurements are successively calculated in the cooling measurement routine as the zone index "i" is increased and cooling modes are noted. In this manner, the incremental value of the cooling measurement index, "k", will follow the successively encountered zones in a cooling mode. If the cooling measurement is greater than zero, the system controller proceeds to step 206 and inquires as to whether the cooling measurement $C\_M_k$ is greater than $AVG\_C\_M$. If the present cooling measurement is greater than the average cooling measurement, the system controller proceeds to a step 208 and calculates an offset bias value for $B_i$. This value is equal to the previously offset value of $B_i$ plus one. Inquiry is next made in a step 210 as to whether the thus calculated value of $B_i$ is greater than the maximum offset value allowable for a flow valve providing chilled water for cooling. If the thus calculated value of $B_i$ is greater than the maximum, it will be reset to the maximum allowable value in step 212. The system controller will either proceed directly out of step 210 or out of step 212 in the event that an adjustment must be made to $B_i$ and increment the cooling measurement index, "k", in a step 214 before incrementing the zone index "i" in step 182 and proceeding back to step 176 in the event that the zone index "i" is not equal to "n". In the event that the next zone is also in a cooling mode, the system controller will inquire as to whether the cooling measurement is greater than zero and proceed to step 204 to compare the cooling measurement of the newly identified zone with the average cooling rate. If this cooling measurement is less than average, the system controller will proceed to step 216 and downwardly adjust the offset bias $B_i$. Inquiry is next made in step 218 as to whether the downwardly adjusted bias is less than a minimum cooling bias for a flow control valve. If so, the value of the calculated bias $B_i$ is set equal to a minimum cooling bias in step 220. The system controller otherwise proceeds directly to step 214 and increments the value of the cooling measurement index "k" before proceeding to step 182 and incrementing the zone index, "i". It is to be appreciated that eventually, all zone controllers will have been examined and the zone index "i" will be equal to "n". At this point, the system controller will have examined all zone controllers for their respective modes of operation and will have computed bias values that are to be used by the respective zone controllers in a manner which will now be described.

The calculated values of offset bias are provided to the respective zone controller in a step 222. This is preferably accomplished by addressing each zone controller identified by a zone index value and transmitting the corresponding $B_i$. Each zone controller will have a zone control process that reads the value of $B_i$ and adjusts the flow control valve being actively controlled. In this regard, each local zone controller will be computing a valve position for the active flow control valve of the zone. This computed valve position will be a function of the local zone conditions such as temperature that are being monitored locally. The zone controller will next subtract the value of the offset bias, $B_i$, from the computed valve position so as to define an adjusted valve position. This latter valve position will be further adjusted if it exceeds the maximum or minimum valve position for this valve. The flow control valve will next be commanded to move to the adjusted valve position. It is to be appreciated that this local zone control process is periodically repeated with each computed valve position being subsequently adjusted by the then current offset bias, $B_i$.

Figure 6B:
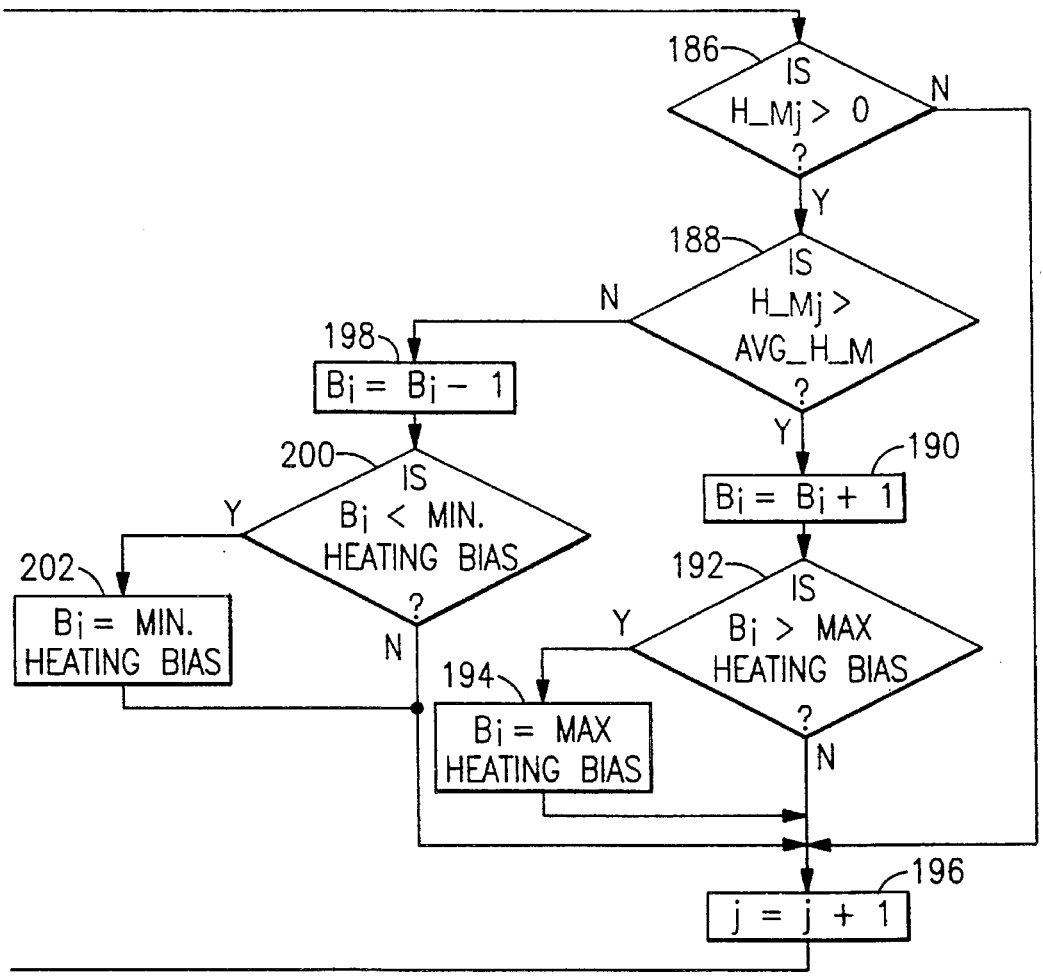

While the zone controllers are actively computing and adjusting valve positions, the system controller will have exited the offset bias routine of FIGS. 6A and 6B and will have proceeded to step 80 of FIG. 2. Referring to step 80, the Δt clock is started. The expiration of this clock is awaited in step 82 before initiating the index "i" in step 83. The process of FIG. 2 is now ready to be repeated once again.

It is to be appreciated that each time the process of FIG. 2 is executed, each zone will be examined for being in a heating or cooling mode and appropriate heating measurements or cooling measurements will be calculated in each zone. These measurements will be subsequently used to calculate average heating and cooling measurements and each zone will thereafter be again examined for whether the heating measurement or the cooling measurement is less than or greater than the average calculated measurement for heating and cooling. Finally, the offset bias routine will be executed and each actively controlled flow control valve for each zone will be adjusted depending on whether a cooling measurement or heating measurement bias is to be applied to the respective flow control valves. In this manner, each zone will be adjusted in terms of the allowed flow of chilled or warmed water. This in turn will define the heating or cooling capacity of the respective heat exchange element of the air handling unit for the particular zone.

It is to be appreciated that a particular embodiment of the invention has been described. Alterations, modifications and improvements thereto will readily occur to those skilled in the art. Such alterations, modifications and improvements are intended to be part of this disclosure even though not expressly stated herein and are intended to be within the scope of the invention. Accordingly the foregoing description is by way of example only and the invention is to be limited only by the following claims and equivalents thereto.

What is claimed is:

1. A process for controlling the flow of a heat exchange medium through flow control valves associated with a plurality of individually controlled zones, each zone having a controller for normally controlling the flow control valves for the particular zone in response to the temperature of the zone, said process residing in a system controller in communication with each zone controller and comprising the steps of:

reading the mode of operation of each zone controller;

computing the amount of time per degree change in temperature occurring in each zone when the zone controller for the zone indicates either a heating or cooling mode of operation;

computing the average amount of time per degree change of temperature occurring in all zones in a heating mode;

computing the average amount of time per degree change of temperature occurring in all zones in a cooling mode of operation;

comparing the computed amount of time per degree change in temperature in each zone with the corresponding average amount of time per degree change of temperature for similar zones having the same heating or cooling mode of operation;

computing a bias value for a flow control valve in each zone in a heating or cooling mode in response to the comparison of the amount of time per degree change in temperature with the corresponding average amount of time per degree change in temperature for similar zones having the same heating or cooling mode of operation; and transmitting the bias value for a control valve in each zone to the zone controller for each zone whereby each zone controller is operative to adjust the maximum open valve position of a flow control valve in the zone by the transmitted bias value.

2. The process of claim 1 wherein said step of computing the amount of time per degree change in temperature occurring in each zone comprises the steps of:

reading the sensed zone temperature from each zone controller;

reading the zone set point temperature from each zone controller; and computing the amount of time per degree change in temperature for each zone when the sensed temperature in a zone varies a predefined amount from the set point temperature for the zone.

3. The process of claim 2 further comprising the step of:

setting the amount of time per degree change in temperature equal to zero for each zone having a sensed temperature within a predefined amount of the zone set point temperature.

4. The process of claim 2 wherein said step of computing the amount of time per degree change in temperature in each zone comprises the steps of:

computing the difference between a temperature previously read from the zone controller for the zone and the temperature currently read from the zone controller for the zone; and dividing an elapsed time that has occurred between the previously sensed reading and the currently sensed reading of temperatures by the computed difference in temperatures for each zone so as to define the amount of time per degree change in temperature in each zone.

5. The process of claim 1 wherein said step of computing the amount of time per degree change in temperature in each zone comprises the steps of:

reading a sensed temperature in each zone from the zone controller for that zone;

computing the difference between a temperature previously read from the zone controller for the zone and the temperature currently read from the zone controller for the zone; and dividing an elapsed time that has occurred between the previously sensed reading and the currently sensed reading of temperatures by the computed difference in temperatures for each zone so as to define the amount of time per degree change in temperature in each zone.

6. The process of claim 1 wherein said step of computing a bias value for at least one flow control valve in each zone in a heating or cooling mode comprises the step of:

incrementing a present bias setting for a flow control valve in each zone that is in a heating or cooling mode of operation when the computed amount of time per degree change in temperature is greater than the average amount of time per degree change in temperature for all zones in the same mode of operation.

7. The process of claim 6 wherein said step of computing a bias value for a flow control valve in each zone in a heating or cooling mode further comprises the step of:

decrementing a present bias setting for a control valve in each zone that is in a heating or cooling mode when the computed amount of time per degree change in temperature is less than the average amount of time per degree change in temperature for all zones in the same mode of operation.

8. The process of claim 7 wherein said step of computing a bias value for at least one flow control valve in each zone in a heating or cooling mode further comprises the step of:

comparing the incremented bias setting to a maximum allowable bias setting for the mode of operation;

substituting the maximum allowable bias setting when the incremented bias setting exceeds the maximum allowable bias setting for the mode of operation;

comparing the decremented bias setting to a minimum allowable bias setting for the mode of operation; and substituting the minimum allowable bias setting when the decremented bias setting falls below the minimum allowable bias setting for the mode of operation.

9. A process for defining the valve positions of flow control valves that govern the flow of a heat exchange medium to individual temperature controlled zones, said process comprising the steps of:

periodically reading the current temperatures of each zone;

computing zone temperature change representations indicating how the read temperatures from each zone are changing relative to an elapsed period of time occurring between successive periodic readings of temperatures from the zone;

computing an average of the zone temperature change representations for all zone controllers in a particular mode of operation;

computing a valve position offset for a flow control valve associated with a zone in the particular mode of operation, each valve position offset being a function of how the zone temperature change representation compares with the average of all zone temperature changes for all zones in the particular mode of operation; and adjusting the valve position of a flow control valve in each zone in the particular mode of operation by the valve position offset for that zone.

10. The process of claim 9 wherein said step of computing an average of the zone temperature change representations for all zones in a particular mode of operation comprises the steps of:

reading the modes of operation of the zones;

summing all zone temperature change representations for all zones having the same mode of operation; and dividing the summed zone temperature change representations for the same mode of operation by the number of zones having the same mode of operation.

11. The process of claim 9 wherein said step of computing a valve position offset for each zone in the particular mode of operation comprises the steps of:

identifying each zone in the particular mode of operation;

comparing the zone temperature change representation indicating how the read temperatures from the identified zone change relative to the elapsed period of time between successive readings from the zones with the average of the zone temperature change representations for all zones in the particular mode of operation; and computing a valve position offset for at least one valve associated with the identified zone; and transmitting the computed valve position offset to a controller associated with the valve.

12. The process of claim 11 wherein said step of computing a valve position offset for at least one valve associated with the identified zone comprises the steps of:

incrementing a bias setting used to define the valve position offset for the valve associated with the identified zone when the zone temperature change representation indicates that the read temperature from the identified zone is changing more slowly than the average of the zone temperature change representations for all zones in the same particular mode of operation.

13. The process of claim 12 wherein said step of computing a valve position offset for at least one valve associated with the identified zone comprises the step of:

decrementing a bias setting used to define the valve position offset for a valve associated with the identified zone when the zone temperature change representation indicates that the read temperature from the identified zone is changing more rapidly than the average of the zone temperature change representations for all zones in the same particular mode of operation.

14. The process of claim 13 wherein said step of computing valve position offset for a valve associated with the identified zone comprises the steps of:

comparing the incremented bias setting to a maximum allowable bias setting for the particular mode operation;

substituting the maximum allowable bias setting when the incremented bias setting exceeds the maximum allowable bias setting for the particular mode of operation;

comparing the decremented bias setting to a minimum allowable bias setting for the particular mode of operation; and substituting the minimum allowable bias setting when the decremented bias setting falls below the minimum allowable bias setting for the particular mode of operation.

* * * * *